Inventor:
Maurice E. Bivens,
by Charles H. Mott
His Attorney.

Patented June 14, 1949

2,473,237

UNITED STATES PATENT OFFICE 2,473,237

ELECTRIC TIMER

Maurice E. Bivens, Schenectady, N. Y., assignor to General Electric Company, a corporation of New York Application February 7, 1948, Serial No. 6,910

6 Claims. (Cl. 315—246)

My invention relates to electric control circuits and more particularly to an improved electric timer. While not limited thereto, my invention is particularly well adapted for controlling the period of energization of a load circuit by means of electric valves.

It is an object of my invention to provide a new and improved electric timer.

It is also an object of my invention to provide an electric timer in which the timing period is a function of the phase angle between two alternating voltages.

It is a further object of my invention to provide an electric timer, the operation of which is not at all critical to initiating contact operation.

Figure 1:
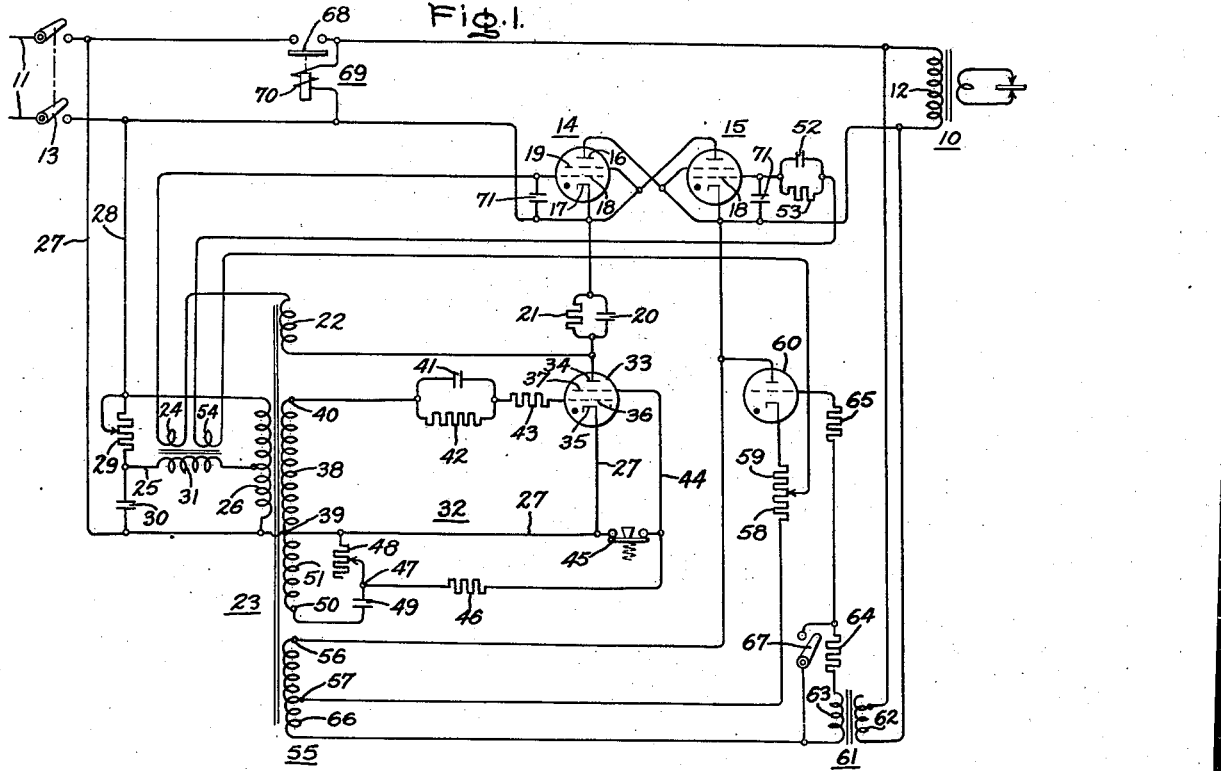
Figure 2:
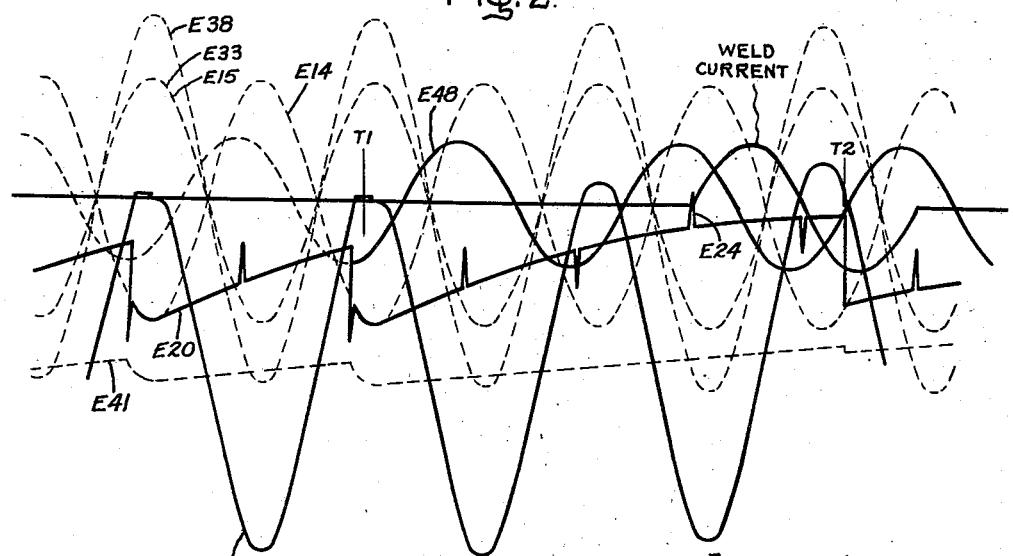

Further objects of my invention will become apparent from the following description of the embodiment diagrammatically represented in Fig. 1 of the drawing, Fig. 2 of which represents various voltage relationships existing in the circuit of Fig. 1 during the operation thereof.

In accordance with my invention the timing operation of a control circuit is adjusted and controlled in accordance with the phase adjustment of a voltage applied to a control electrode of an electric valve forming part of the control circuit. In the particular arrangement illustrated this electric valve is of the arc discharge type and has a pair of principal electrodes and a pair of control electrodes the conjoint action of which control conductivity between its principal electrodes. One of these control electrodes has impressed thereon an alternating turn-on voltage and the direct current bias voltage of a capacitor which is charged to the crest value of the turn-on voltage by the rectifying action of the circuit completed through the electric valve between this control electrode and one of its principal electrodes. So long as the electric valve is held non-conducting, by an alternating voltage applied to its other control electrode, the bias voltage of this capacitor decreases at a rate determined by the characteristics of a circuit connected across it, and acting continuously to discharge it. Variations in timing are secured by varying the phase of the alternating voltage applied to the other control electrode of the electric valve and thereby selecting the instantaneous value less than the maximum value of the turn-on voltage which is effective for overcoming the bias voltage of the capacitor and thereby rendering the electric valve conducting. The timing operation is initiated by operating a switch which controls the application of this phase shift voltage to the other control electrode of the electric valve. Operation of this switch cannot interfere with the normal charging operation of the timing capacitor but prevents recharge thereof until the capacitor discharges from its crest value of charging voltage to the selected value of instantaneous voltage thereof which is effective for overcoming the bias voltage of the capacitor to render the electric valve conducting. Thus, operation of the switch can in no way disturb the accuracy of the timing operations which depend on the charge supplied to the timing capacitor, for once this charging operation has begun it will continue until the crest value of the turn-on voltage is reached irrespective of when the control switch is operated.

Except for the timing circuit employed, the illustrated embodiment of my invention shown in Fig. 1 is like that disclosed in Fig. 1 of my Patent 2,359,080, granted September 26, 1944, and assigned to the assignee of this invention.

The embodiment of my invention illustrated in Fig. 1 is employed for controlling the energization of a resistance welding transformer 10 from an alternating current supply circuit 11. The primary winding 12 of the welding transformer is connected with the supply circuit 11 through the contacts of a line switch 13 and a pair of electric valves 14 and 15 which are reversely connected in parallel to supply alternating current to the welding transformer 10. The electric valves 14 and 15 may be of any of the types well known in the art and as illustrated each comprises an anode 16, a cathode 17, a control member or grid 18, and a shield grid 19. The elements of each of the electric valves are enclosed in an envelope preferably containing an ionizable medium such as a gas or vapor. The electric valve 14 may be designated the leading valve inasmuch as the periods of energization of the load circuit are controlled by controlling the excitation of the control member 18 thereof while the electric valve 15 is rendered conductive only for half cycles immediately following a half cycle of conduction of the leading valve.

The excitation circuit for the control member 18 of electric valve 14 includes in series a capacitor 20 having a discharge resistor 21 connected in parallel therewith, the secondary winding 22 of a transformer 23, and the secondary winding 24 of a transformer 25. The secondary winding 22 impresses on the control member 18 of electric valve 14 an alternating current component of voltages which is substantially 180 electrical degrees out of phase with the anode-cathode voltage of this electric valve. The winding 24 impresses a voltage of peaked-wave form on the control member 18 of electric valve 14 which has an adjustable phase relation with respect to the supply circuit voltage.

Transformer 23 has a midtapped primary winding 26 energized from the supply circuit 11 through conductors 27 and 28. The midtap of the winding 26 and the common terminal of an adjustable resistor 29 and a capacitor 30 which are connected in series across the end terminals of winding 26, provide a source of adjustable phase alternating current voltage to which the primary winding 31 of transformer 25 is connected for inducing the voltage of adjustable phase in the secondary winding 24 thereof.

The transformer 23 also provides a source of alternating current turn-on voltage for the improved timing circuit of Fig. 1 which is designated generally by the reference numeral 32. This timing circuit includes an electric valve 33 having a pair of principal electrodes and a pair of control electrodes. This electric valve 33 is an arc discharge device having an anode 34, a cathode 35, a control member 36, and a second control member 37, all of which are enclosed within an envelope preferably containing an ionizing medium such as a gas or vapor.

The anode 34 of electric valve 33 is connected through capacitor 20 and resistor 21 to the cathode 17 of the leading electric valve 14 which is also one side of the alternating current supply circuit 11. The cathode 35 of electric valve 33 is connected to the other side of the alternating supply circuit 11 through conductor 27. It will be noted that the anode-cathode voltage of the timing valve 33 is in phase with the anode-cathode voltage of the trailing valve 15.

A source of alternating turn-on voltage is impressed on control electrode 36 of electric valve 33 by the secondary winding 38 of transformer 23. One terminal 39 of this winding is connected through conductor 27 to the cathode 35 of electric valve 33 and the other terminal 40 thereof is connected to a self-biasing means comprising a capacitor 41 and its parallel discharge resistor 42, and a current limiting resistor 43 to the control electrode 36 of electric valve 33. It will thus be noted that the control electrode 36 of electric valve 33 is energized by two components of voltage one of which is the alternating turn-on voltage of winding 38 of transformer 23 and the other of which is the unidirectional bias voltage of the capacitor 41. This capacitor 41 is charged to a voltage equal to the maximum value of the turn-on voltage by reason of the rectifier action of the circuit completed therethrough between the control electrode 36 and cathode 35 of electric valve 33.

The other control electrode 37 of electric valve 33 is normally connected directly to the cathode 35 of electric valve 33 through a circuit including a conductor 44, the normally closed contacts of a control switch 45 and conductor 27. When the control switch 45 is opened by operation thereof, the control electrode 37 of electric valve 33 has impressed thereon an alternating control voltage which is adjustable in phase relative to the anode-cathode voltage of this electric valve so as to lag this anode-cathode voltage by amounts greater than 90 electrical degrees, and preferably between 90 and 160 electrical degrees. This adjustable phase shift voltage is obtained by connecting control electrode 37 through conductor 44 and a current limiting resistor 46 to the common terminal 47 of an adjustable resistor 48 and a capacitor 49 which are connected in series with one another across the end terminals 39 and 50 of a secondary winding 51 of transformer 23. The amount this control voltage is shifted in phase relative to the anode-cathode voltage of electric valve 33 depends on the adjustment of resistor 48.

Before describing the operation of the above described timing circuit 32, and the manner in which it controls the leading electric valve 14, the control for effecting conduction of electric valve 15 in response to each conduction of electric valve 14 will be described.

The cathode-to-control-electrode circuit of electric valve 14 includes in series a self-biasing circuit including a capacitor 52 and resistor 53, a secondary winding 54 of transformer 25 and a portion of the voltage of a secondary winding 55 of transformer 23. The end terminal 56 of winding 55 is connected directly to the cathode of electric valve 15 and an intermediate terminal 57 of transformer winding 55 is connected to the cathode of electric valve 15 through current dividing resistors 58, 59 and the anode-cathode circuit of an electric valve 60 which is preferably of the gas-filled type. Thus it is seen that when electric valve 60 is non-conducting the voltage between terminals 56 and 57 of winding 55 is impressed on the control member 18 of electric valve 15. However, when electric valve 60 is conducting the voltage on control member 18 of electric valve 15 is reduced to a fraction of this voltage depending on the relative magnitudes of resistors 58 and 59. The instantaneous polarity of the voltage impressed on control electrode 18 of electric valve 15 by transformer winding 55 is such as to maintain this electric valve non-conducting when electric valve 60 is non-conducting.

The conductivity of electric valve 60 and as a result thereof the conductivity of electric valve 15 is controlled in accordance with the energization of the primary winding 12 of welding transformer 10 by current conducted by electric valve 14 by means of a transformer 61 having its primary winding 62 energized whenever the primary winding 12 of welding transformer 10 is energized. The secondary winding 63 of transformer 61 has one terminal thereof connected with the control member of electric valve 60 through current limiting resistors 64 and 65 and the other terminal thereof connected to the cathode of electric valve 60 through a portion 66 of the secondary winding 55 of transformer 23 and the resistors 58 and 59. The voltage of the winding portion 66 tends to maintain electric valve 60 non-conducting and this voltage is overcome by the voltage of winding 63 of transformer 61 each time the leading electric valve 14 conducts current to energize the primary winding 12 of transformer 10 and concurrently therewith the primary winding 62 of transformer 61. This renders electric valve 60 conducting in response to a period of conduction of the leading electric valve 14.

The voltages of the excitation circuit of control member 18 of the trailing electric valve 15 are such that the reduction in the alternating current hold-off voltage resulting from conduction of electric valve 60 is not in itself sufficient to render this valve conductive. This is accomplished at a definite time in the anode-cathode voltage thereof by means of the peaked voltage produced by the secondary winding 54 of transformer 25 which may be adjusted in phase by varying the magnitude of resistor 29 of the phase shift circuit of which it forms a part. The circuit above described for controlling the conduction of electric valve 15 in trailing relationship with respect to electric valve 14 and for the same portion of the anode-cathode voltage wave is similar to the circuit disclosed and claimed in my Patent 2,283,719, granted May 19, 1942, and assigned to the same assignee as the present invention.

In order to control the system for half cycle operation, I provide means for disabling the control circuit of the trailing electric valve 15 by closing a switch 67 which shunts the secondary winding 63 of transformer 60 through the current limiting resistor 64.

Capacitors 71 are connected across the control electrodes and cathodes of electric valves 14 and 15 to render these valves resistant to faulty operation resulting from transient anode voltages applied thereto. Although not illustrated in the drawing like capacitors may be connected across the control electrodes and cathodes of electric valves 33 and 60.

The circuits employed for heating the cathodes of the electric valves 14, 15, 33 and 60 have been omitted in Fig. 1 of the drawing in order to simplify it. As is well understood, it is desirable to provide for the heating of the cathodes to normal operating temperature before the application of anode-cathode voltage to the valves in cases where the valves are called upon to deliver a considerable current. As illustrated in Fig. 1, the anode-cathode circuits of control valves 33 and 60 are energized immediately upon closure of switch 13. This insures that the electric valve 33 of timing circuit 32 will function immediately to charge capacitor 20 to impress a negative voltage on the control member 18 of the leading electric valve 14 before anode-cathode voltage is impressed on this electric valve. Because of the limited current transmitted by valves 33, such operation is not detrimental. In the particular arrangement illustrated in the drawing, the application of anode-cathode voltage to the electric valves 14 and 15 is accomplished manually after the switch 13 has been closed and the cathodes have attained operating temperatures, by closing the contact 68 of an under-voltage relay 69 having its coil 70 energized from the load side of contact 68. In this way, the contact 68 is maintained closed after manual closing thereof. It will be apparent that any suitable control may be employed for insuring that the cathodes of the electric valves are brought to proper operating temperature and that the timer circuit is energized before the main electric valves are called upon to pass load current.

The features and advantages of my invention may be better understood from a brief consideration of the operation of the embodiment thereof illustrated in Fig. 1 by reference to the voltage relationships of certain elements thereof as illustrated in Fig. 2.

When switch 13 is closed, the primary winding 26 of transformer 23 is energized and the control electrode 36 of electric valve 33 is energized with an alternating component of voltage E38 of Fig. 2 which corresponds to the voltage across terminals 39 and 40 of this winding. This voltage is of a polarity to render electric valve 33 conductive when its anode voltage is positive, and consequently may be identified as a turn-on voltage. This turn-on voltage produces a negative bias voltage in circuit therewith by charging capacitor 41 through a circuit including the rectifying path between control electrode 36 and cathode 35 of electric valve 33. In common parlance the capacitor 41 is charged by the grid rectification of electric valve 33. This negative bias voltage is shown at E41 in Fig. 2 and the total excitation voltage impressed on control electrode 36 of electric valve 33 is represented in Fig. 2 as E38+E41, which is composed of both the above identified components of turn-on voltage and negative bias voltage.

The charge on capacitor 41 is continually reduced by the discharge resistor 42 and consequently once for each cycle of the alternating current supply, the electric valve 33 is rendered conductive at a time when the turn-on voltage E38 is greater than the direct current bias voltage E41 of capacitor 41. Thus, once for each cycle of the supply voltage, the charge on capacitor 41 is restored to the maximum value of the alternating voltage E38 provided, of course, the other control electrode 37 of electric valve 33 is directly connected to its cathode 35 through the closed contacts of switch 45.

Each time electric valve 33 is rendered conducting it replenishes the charge of capacitor 20 connected in its anode-cathode circuit and the negative biasing voltage of this capacitor E20 of Fig. 2 maintains electric valve 14 non-conducting.

It will be noted by referring to the first part of the voltage diagram of Fig. 2 that up until time T1 the capacitors 41 and 20 are recharged each cycle to the crest values of the alternating voltages in circuit therewith. Once these charging operations have been initiated they will continue irrespective of any control exerted on electric valve 33 by its control electrode 37. Thus, if the switch 45 is operated at a time T1 in Fig. 2 when the capacitors 41 and 20 are being charged, these charging operations will continue until these capacitors have been charged to the maximum value of the alternating current voltage in circuit therewith, disregarding, of course, the voltage drop in these charging circuits and in the electric valve 33 forming part thereof. This guarantees that the timing capacitor 41 will always be charged to the same value of voltage irrespective of the time at which control switch 45 is operated. This will guarantee accurate timing of the circuit in response to the voltage value of the capacitor 41.

When, for example at T1 in Fig. 2, the control switch 45 is operated to open its contacts, the control electrode 37 of electric valve 33 has impressed thereon a control voltage E48 of Fig. 2 which in the diagram by way of illustration, lags the anode-cathode voltage of electric valve 33 by about 135 electrical degrees. Consequently the electric valve 33 cannot again become conducting until this voltage E48 has gone sufficiently positive to release electric valve 33 for conduction, in response to the voltages impressed on control electrode 36 of this electric valve. At some time subsequent to the operation of control switch 45, which depends on the amount the voltage applied to control electrode 37 lags the anode-cathode voltage of electric valve 33, the turn-on voltage E38 applied to control electrode 36 will become of greater magnitude than the negative bias voltage E41 of capacitor 41. At this time, T2 in Fig. 2, the electric valve 33 will again become conductive to replenish the negative bias voltage of capacitor 20 and thereby render electric valve 14 non-conducting. When electric valve 33 thus again becomes conductive bias voltage E20 is again restored to a value which will hold electric valve 14 nonconductive as illustrated in Fig. 2.

While electric valve 33 is held non-conductive, the negative bias voltage E20 of capacitor 20 decreases until it finally attains a value which can be overcome by the peaked voltage value E24 of winding 24 of transformer 25. In the voltage diagram illustrated, this occurred at the power factor phase angle of the load 10 causing the welding current to flow for one cycle as illustrated. From what has been previously stated above, it is obvious that with switch 67 open, once the leading electric valve 14 is rendered conducting, the trailing electric valve 15 also becomes conducting during the next half cycle of the alternating supply voltage. Of course, if the system is to be operated for energization periods of one-half cycle or less, the switch 67 will be closed in order to prevent trailing operation of electric valve 15 in response to conduction of electric valve 14.

Fig. 2 has been simplified by omitting the alternating hold-off voltage produced by transformer winding 22 and impressed on the grid 18 of electric valve 14. The magnitude of this voltage is co-related with the other voltages of the excitation circuit of electric valve 14 so that the operation described above is accomplished. This voltage insures that the leading electric valve 14 will not conduct at any time other than that determined by the peaked voltage of secondary winding 24 of transformer 25 even, when the voltage of capacitor 20 is reduced to zero.

From what has been stated above, it is apparent that I have provided an electric timing circuit which may be adjusted for operation at different time settings depending upon a function of the phase angle between two alternating voltages. In the particular circuit illustrated, it is possible by adjusting the amount by which the control voltage applied to one of the control electrodes of an electric valve lags the anode-cathode voltage thereof, to select the instantaneous value less than the maximum value of the turn-on voltage applied to the other control electrode of the electric valve which is effective for overcoming the bias voltage of the timing capacitor and thereby determine the operating time interval of the timing circuit. No matter when the control switch is operated to secure the desired timing operation, the timing capacitor will always be charged to the crest value of the alternating turn-on voltage and the time interval which depends upon this charge can in no way be affected by operation of the control switch. In my improved control circuit there can never be any interference with the normal charging of the timing capacitor even if the control switch is operated during the charging instant.

It is of course obvious that my invention is not limited to the particular embodiment thereof illustrated and described above. It is also obvious that various timing adjustments may be accomplished by selectively connecting to control electrode 37 of electric valve 33 more than one control voltage each of which differs in phase from the other by an amount suitable for securing different timing operations of the timing circuit. It is also apparent that the resistor 42 or an equivalent circuit connected in shunt to timing capacitor 41 may also be adjusted for securing different timing operations, in which case the adjustable phase shift voltage employed for holding the electric valve 33 non-conducting until the maximum turn-on voltage has decreased by a predetermined amount from its maximum value, may be used as an added adjustment or factory calibration to take care of variations or tolerances in the various circuit components employed.

The above suggested embodiments of my invention will suggest other embodiments thereof to those skilled in the art and I aim consequently to cover all those modifications which come within the true spirit and scope of my invention as defined in the appended claims.

What I claim as new and desire to secure by Letters Patent of the United States is:

1. An electric timer comprising an alternating current supply circuit, an arc discharge device having a pair of principal electrodes and a pair of control electrodes, means connecting said principal electrodes of said arc discharge device for energization from said supply circuit, means for impressing on one of said control electrodes of said arc discharge device an alternating turn-on voltage, a capacitor connected to said one of said control electrodes of said arc discharge device and in series with said turn-on voltage and the rectifying circuit between said one of said control electrodes and one of said principal electrodes of said arc discharge device for charging to a voltage equal to the maximum value of said turn-on voltage, a circuit connected across said capacitor and acting continuously to discharge said capacitor, and means for selecting the instantaneous value less than the maximum value of said turn-on voltage which is effective for overcoming the bias voltage of said capacitor and for rendering said arc discharge device conductive, said means including means for impressing on the other of said control electrodes of said arc discharge device an alternating voltage which lags the anode-cathode voltage of said arc discharge device by an amount greater than 90 electrical degrees which is sufficient to release said arc discharge device for conduction upon the attainment of said selected instantaneous value of turn-on voltage.

2. An electric timer comprising an alternating current supply circuit, an arc discharge device having a pair of principal electrodes and a pair of control electrodes, means connecting said principal electrodes of said arc discharge device for energization from said supply circuit, means for impressing on one of said control electrodes of said arc discharge device an alternating turn-on voltage, a capacitor connected to said one of said control electrodes of said arc discharge device and in series with said turn-on voltage and the rectifying circuit between said one of said control electrodes and one of said principal electrodes of said arc discharge device for charging to a voltage equal to the maximum value of said turn-on voltage, a circuit connected across said capacitor and acting continuously to discharge said capacitor, and means for selecting the instantaneous value less than the maximum value of said turn-on voltage which is effective for overcoming the bias voltage of said capacitor and for rendering said arc discharge device conductive, said means including means for controlling the application of an alternating voltage to the other of said control electrodes of said arc discharge device, and means for adjustably retarding by amounts greater than 90 electrical degrees the phase of said control voltage relative to the anode-cathode voltage of said arc discharge device.

3. An electric timer comprising an alternating current supply circuit, an arc discharge device having a pair of principal electrodes and a pair of control electrodes, means connecting said principal electrodes of said arc discharge device for energization from said supply circuit, means for impressing on one of said control electrodes of said arc discharge device an alternating turn-on voltage, a capacitor connected to said one of said control electrodes of said arc discharge device and in series with said turn-on voltage and the rectifying circuit between said one of said control electrodes and one of said principal electrodes of said arc discharge device for charging to a voltage equal to the maximum value of said turn-on voltage, a circuit connected across said capacitor and acting continuously to discharge said capacitor, and means for adjustably controlling the time period during which the charge of said capacitor maintains said arc discharge device non-conducting, said means including means for impressing an alternating control voltage on the other of said control electrodes of said arc discharge device and means for adjustably retarding the phase of said control voltage relative to the anode-cathode voltage of said arc discharge device by an amount greater than 90 electrical degrees which is sufficient to release said arc discharge device for conduction when the instantaneous value of said turn-on voltage has decreased from its maximum value to a predetermined selected value.

4. An electric timer comprising an alternating current supply circuit, an arc discharge device having an anode, a cathode and a pair of control electrodes, means connecting the anode-cathode circuit of said arc discharge device for energization from said supply circuit, means for impressing on said one of said control electrodes of said arc discharge device an alternating voltage which is positive in value when the anode of said arc discharge device is positive, a capacitor connected to said one of said control electrodes of said arc discharge device and in series with said alternating voltage and the rectifying circuit between said one of said control electrodes and the cathode of said arc discharge device for changing to a voltage equal to the maximum value of said alternating voltage, a circuit continuously acting to discharge said capacitor, means for impressing an alternating control voltage on the other of said control electrodes of said arc discharge device, and means for adjustably retarding by amounts greater than 90 electrical degrees the phase of said control voltage relative to the anode-cathode voltage of said arc discharge device and thereby selecting the instantaneous value less than the maximum value of said alternating voltage which is impressed on said one of said control electrodes for rendering said arc discharge device conducting.

5. An electric timer comprising an alternating current supply circuit, an arc discharge device having an anode, a cathode and a pair of control electrodes, means connecting the anode-cathode circuit of said arc discharge device for energization from said supply circuit, means for impressing on said one of said control electrodes of said arc discharge device an alternating voltage which is positive in value when the anode of said arc discharge device is positive, a capacitor connected to said one of said control electrodes of said arc discharge device and in series with said alternating voltage and the rectifying circuit between said one of said control electrodes and the cathode of said arc discharge device for changing to a voltage equal to the maximum value of said alternating voltage, a circuit continuously acting to discharge said capacitor, means for impressing an alternating control voltage on said other of said control electrodes of said arc discharge device, means for adjustably retarding by amounts greater than 90 electrical degrees the phase of said control voltage relative to the anode-cathode voltage of said arc discharge device and thereby selecting the instantaneous value less than the maximum value of said alternating voltage which is impressed on said one of said control electrodes for rendering said arc discharge device conducting, and means including a switch for making and breaking a direct electric connection between said other of said control electrodes and said cathode of said arc discharge device.

6. An electric timer comprising an alternating current supply circuit, an arc discharge device having an anode, a cathode and a pair of control electrodes, means connecting the anode-cathode circuit of said arc discharge device for energization from said supply circuit, means for impressing on one of the control electrodes of said arc discharge device an alternating voltage which is in phase with the anode-cathode voltage of said arc discharge device, a capacitor connected to said one of said control electrodes of said arc discharge device and in series with said alternating voltage and the rectifying circuit between said one of said control electrodes and said cathode of said arc discharge device for charging to a voltage equal to the maximum value of said alternating voltage, a circuit connected across said capacitor and acting continuously to discharge said capacitor, means for impressing an alternating control voltage on said other of said control electrodes of said arc discharge device, means for adjustably retarding the phase of said control voltage relative to the anode-cathode voltage of said arc discharge device by amounts greater than 90 electrical degress, and means including a switch for making and breaking a direct electrical connection between said other of said control electrodes and said cathode of said arc discharge device.

MAURICE E. BIVENS.

REFERENCES CITED

The following references are of record in the file of this patent:

UNITED STATES PATENTS

| Number | Name | Date |
| --- | --- | --- |
| 2,404,643 | Livingston | July 23, 1946 |